(12) United States Patent
Kobayashi

(10) Patent No.: US 6,326,860 B1
(45) Date of Patent: Dec. 4, 2001

(54) AMPLITUDE MODULATOR CAPABLE OF MINIMIZING POWER LEAKAGE TO ADJACENT CHANNELS

(75) Inventor: Bun Kobayashi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/563,889

(22) Filed: May 3, 2000

(30) Foreign Application Priority Data

May 10, 1999 (JP) .................................................. 11-128561

(51) Int. Cl.[7] .............................. H03C 1/36; H04L 27/04
(52) U.S. Cl. .......................... 332/159; 332/178; 375/268; 375/300; 455/108
(58) Field of Search ..................................... 332/149, 159, 332/178; 375/268, 300; 455/108

(56) References Cited

U.S. PATENT DOCUMENTS

| | | | | |
|---|---|---|---|---|
| 3,723,880 | * | 3/1973 | Van Gerwen ......................... | 375/286 |
| 3,860,871 | * | 1/1975 | Hinoshita et al. .................... | 375/290 |
| 4,346,472 | * | 8/1982 | Ohkoshi et al. ...................... | 714/701 |

OTHER PUBLICATIONS

M.D. Pollman, et al., "A Low–Cost Packaged MMIC Chip Set For 5.8 GHz ISM Band Applications", *1997 IEEE Radio Frequency Integrated Circuits Symposium*, pp. 33–36.

Shigeru Arai, et al., "Electronic Toll Collection System", *Oki Denki Kenkyu Kaihatsu 181*, vol. 66, No. 2, pp.51–54; Oct. 1999.

\* cited by examiner

*Primary Examiner*—Siegfried H. Grimm
(74) *Attorney, Agent, or Firm*—Rabin & Berdo, P.C.

(57) ABSTRACT

A transmission front-end processor modulates the amplitude of a carrier wave with baseband data, and sets the power of the resultant modulated wave at a required value while controlling power leakage to adjoining channel to thereby output transmission data. The processor includes a first filter connected to an input terminal to which the baseband data are applied, for removing frequency components which would otherwise cause the power of the baseband data to leak to adjoining channels. The carrier wave and the baseband data passed through the first filter are applied to a power modulator. The power modulator controls the amplitude of the carrier wave with the baseband data, sets the power of the result of the control at the required value, and then outputs the power. A second filter removes higher order components from the carrier wave included in the output of the power modulator to thereby output the transmission data. The processor is capable of outputting high power without resorting to a linear amplifier.

11 Claims, 7 Drawing Sheets

AMPLITUDE MODULATOR CAPABLE OF MINIMIZING POWER LEAKAGE TO ADJACENT CHANNELS

BACKGROUND OF THE INVENTION

1. Field of the Invention

The present invention relates to a transmission front-end processor built in, e.g., an on-board radio apparatus for a nonstop, electronic toll collection (ETC) system applicable to limited-access highways or toll roads. The front-end processor is constructed to modulate a carrier wave with baseband data and radiate the modulated carrier wave.

2. Description of the Background Art

Technologies relating to a transmission front-end processor are disclosed in, e.g., M. D. Pollman et al. "A Low-Cost Package MMIC Chip Set for 5.8 GHz ISM Band Application", 1997 IEEE Radio Frequency Integrated Circuits Symposium (USA), pp. 33–36. A front-end processor taught in this document includes a modulator, a band-pass filter connected to the output of the modulator, and a linear power amplifier connected to the output of the band-pass filter. The power amplifier includes an FET (Field Effect Transistor). Baseband data with a modulation rate of, e.g., 2 Mbaud and a carrier wave Sc lying in a 5.8 GHz band are input to the modulator. The modulator modulates the carrier wave with the baseband data and feeds the resulting signal to the band-pass filter.

More specifically, the modulator controls the amplitude of the carrier wave with the level of the baseband data and outputs an ASK (Amplitude Shift Keying) type of signal. However, the signal output from the modulator contains not only the frequency component of the carrier wave, but also components leaking to adjoining channels due to the frequency components of the baseband data. In light of this, the bandpass filter, or narrow-band channel filter, serves to reduce power leaking to adjoining channels. The maximum power of a signal output from the bandpass filter is not greater than several decibels referred to one milliwatt (dBm) and is smaller than the transmission power required of an ETC system, i.e., 13 dB. The linear power amplifier linearly amplifies the output signal of the bandpass filter so as not to vary the spectrum of the signal and thereby outputs transmission data with power meeting the above requirement.

The above conventional front-end processor has the following problems left unsolved. To provide the signal to be transmitted with the power required of the system, the linear power amplifier including an FET is essential. The FET is designed to perform class-A amplification in order to assure its linearity. However, when the circuitry of the front-end processor is implemented in the form of an IC (Integrated Circuit), the FET is apt to operate at a point deviated from its designed value and therefore in its nonlinear range. This aggravates spurious oscillation and the leakage of power to adjoining channels. The manufacturing of the linear power amplifier in the form of ICs therefore reduces the yield of ICs to a critical degree.

Moreover, to maintain linearity and to send data free from higher order waves or harmonics, the FET of the above linear power amplifier must be so fabricated as to effect power amplification with power up to 1 dB gain compression power (P 1dB). Should the gate width of the FET be increased in order to meet this requirement, the dimensions of the IC chip and therefore the production cost would increase. In addition, because the linear power amplifier must operate at the class-A level, great bias current flows through the amplifier. This is undesirable from the power consumption standpoint.

SUMMARY OF THE INVENTION

It is therefore an object of the present invention to provide a transmission front-end processor for controlling the amplitude of a carrier wave with baseband data and capable of outputting great power without resorting to a linear power amplifier.

A transmission front-end processor of the present invention modulates the amplitude of a carrier wave with baseband data, and sets the power of the resultant, modulated carrier wave at a required value while controlling the leakage of power to adjoining channels to thereby output transmission data. The front-end processor includes a first filter connected to an input terminal to which the baseband data are applied, for removing frequency components which would otherwise cause the power of the baseband data to leak to the adjoining channels. The carrier wave and the baseband data passed through the first filter are applied to a power modulator. The power modulator controls the amplitude of the carrier wave with the baseband data, sets the power of the result of the control at the required value, and then outputs the power. A second filter removes higher order components from the carrier wave included in the output of the power modulator to thereby output the transmission data.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
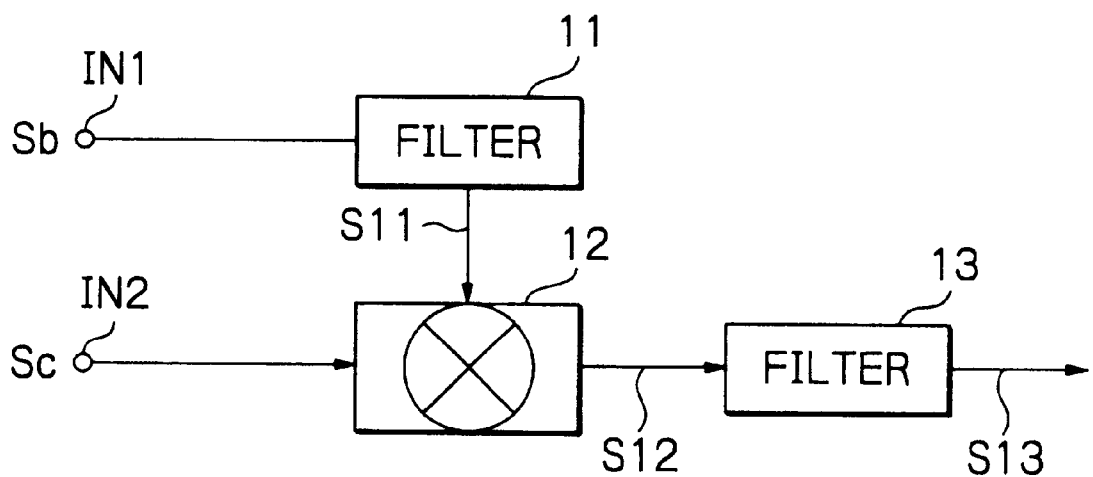
FIG. 1 is a block diagram schematically showing a transmission front-end processor embodying the present invention.

Referring to FIG. 1 of the drawings, a transmission front-end processor embodying the present invention is built in a radio apparatus applicable to an ETC system by way of example. As shown, the front-end processor is generally made up of a first filter 11, a high power modulator 12, and a second filter 13. The first filter 11 is connected to an input terminal IN1 for removing high frequency components from baseband data Sb applied to the input terminal IN1. The high power modulator 12 is connected to the output of the filter 11 and an input terminal IN2 to which a carrier wave Sc lying in the 5.8 GHz band is applied. The second filter 13 is connected to the output of the high power modulator 12. In the following, connections are sometimes designated by reference numerals referring to the signals appearing thereon.

The high power modulator 12 includes an FET, not shown, acting as an amplifier. The modulator 12 causes the FET to operate up to the nonlinear amplifying, saturated range and then outputs modulated data S12 having power required for transmission data. For example, if the voltage of the baseband data Sb is 3 V when in a high level, then the modulated data S12 output from the modulator 12 is 16 dBm satisfying the order of transmission power required for the ETC system. It is to be noted that modulator 12 performs modulation in such a manner as to make the amplitude of the fundamental or primary wave of the carrier wave Sc linear relative to the voltage of the baseband data Sb. The second filter 13 removes from the output signal S12 of the modulator 12 higher order components or harmonics resulting from the modulation.

In operation, the baseband data Sb with a modulation rate of, e.g., 2 Mbaud are fed to the filter 11 via the input terminal IN1. The filter 11 removes high frequency components contained in the baseband data Sb and which would otherwise cause power to leak to adjoining channels. As a result, a signal S11 lying in a limited frequency band appears on the output of the filter 11. The signal 11 and 5.8 GHz carrier wave Sc are input to the high power modulator 12. The modulator 12 amplifies the carrier wave Sc with the FET operable not only in the linear amplification range but also up to the saturated, nonlinear amplification range thereof. The modulator 12 then controls the amplitude of the amplified carrier wave Sc with the voltage of the output signal S11 of the filter 11, thereby modulating the amplitude of the carrier wave Sc. The resulting modulated data S12 have power required for the system and are fed from the modulator 12 to the filter 13. The filter 13 removes the higher order components (e.g. above 11.6 GHz) of the carrier wave Sc contained in the modulated data S12. The filter 13 produces an output signal S13 that is in turn sent as the transmission data from the front-end processor.

As stated above, the illustrative embodiment does not include the conventional linear power amplifier. Specifically, the embodiment does not amplify the transmission power of data to be transmitted with a linear amplifier, but causes the FET of the great power modulator 12 to operate up to the saturated range to thereby produce modulated data having the required power. The front-end processor can therefore be implemented as an IC with high yield. Further, the FET of the modulator 12 is capable of outputting power exceeding the previously mentioned P1dB, i.e., power greater than that of the conventional power amplifier including an FET with a given gate width. This allows the front-end processor to be constructed into a small size, low cost IC.

Moreover, the filter 11 has only to remove high frequency components causative of power leakage to nearby channels while the filter 13 has only to remove higher order components from the carrier wave Sc included in the modulated data S12. The filters 11 and 12 are therefore simpler in configuration than the conventional bandpass filter, or narrow band channel filter, needing high accuracy.

Figure 2:
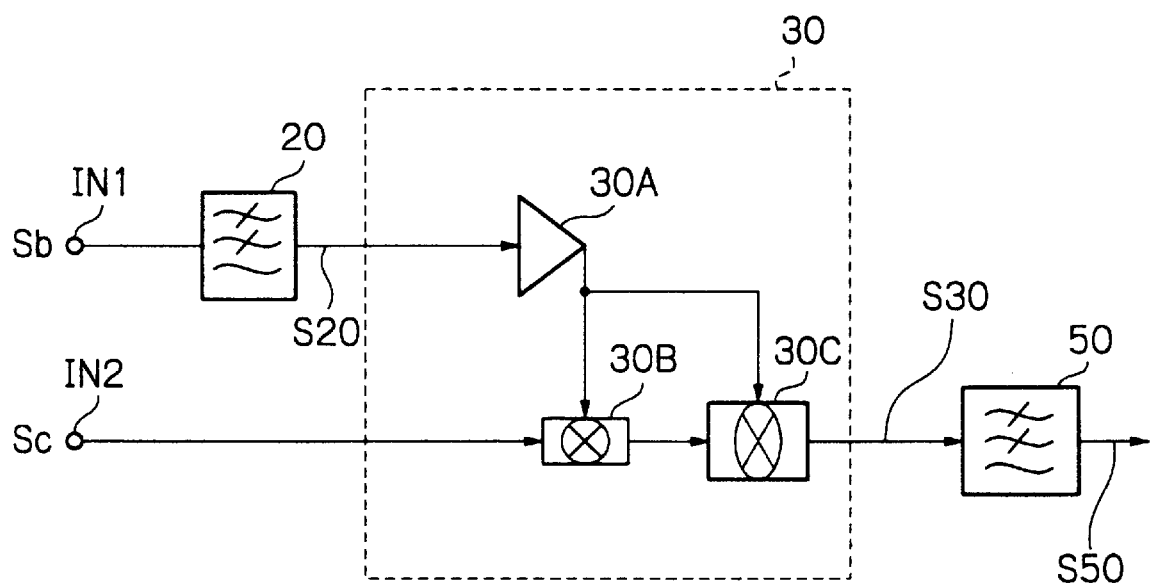
FIG. 2 is a schematic block diagram showing an alternative embodiment of the front-end processor in accordance with the present invention.

An alternative embodiment of the transmission front-end processor in accordance with the present invention will be described with reference to FIG. 2. As shown, the front-end processor includes input terminals IN1 and IN2 to which baseband data Sb and a carrier wave Sc, respectively, are input. An LC low-pass filter 20 is connected to the input terminal IN1. A drain-controlled power modulator 30 is connected to the output of the LC low-pass filter 20 and input terminal IN2. A low-pass filter 50 is connected to the output of the modulator 30.

The LC low-pass filter 20 corresponds to the low-pass filter 11 of the previous embodiment. The low pass filter 20 has a ladder circuit including a plurality of on-chip inductors connected in serial between its input terminal IN1 and its output terminal S20 and an on-chip capacitor connected in parallel with the ground, or a reference voltage, although not shown specifically. The drain-controlled power modulator 30 is a substitute for the high power modulator 12 of the previous embodiment. The power modulator 30 includes a driver 30A connected to the output of the LC low-pass filter 20. A premodulating circuit 30B is provided to modulate the carrier wave Sc input via the input terminal IN2 with a signal output from the driver 30A. A main modulating circuit 30C is adapted to modulate a signal output from the premodulating circuit 30B with the output signal of the driver 30A. The low-pass filter 50 corresponds to the filter 13 of the previous embodiment.

Figure 3:
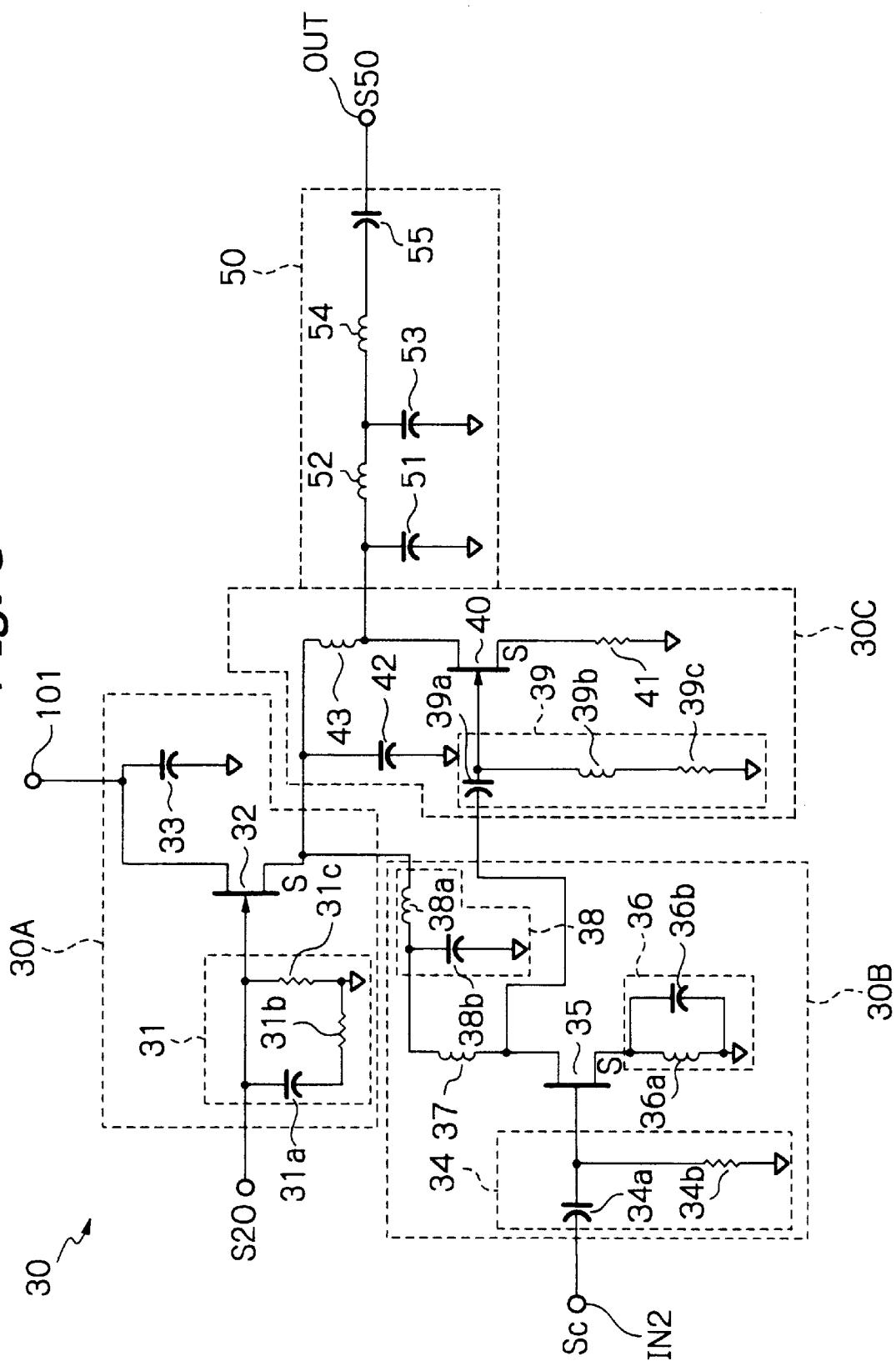
FIG. 3 is a circuit diagram showing a specific configuration of a drain-controlled power modulator and a low-pass filter included in the embodiment of FIG. 2.

FIG. 3 shows a specific configuration of the drain-controlled power modulator 30 and low-pass filter 50. As shown, the driver 30A of the power modulator 30 is made up of an input section 31, an FET 32, and a capacitor 33 playing the role of a decoupling circuit. The input section 31 includes a capacitor 31a having one electrode thereof connected to the output S20 of the LC low-pass filter 20 and the other electrode to the ground via a resistor 31b, and a resistor 31c connected between the output S20 of the filter 20 and the ground. With this configuration, the input section 31 matches the circuitry of FIG. 3 to the LC low-pass filter 20 while biasing the output signal of the filter 20.

The FET 32 has a gate connected to the junction of the capacitor 31a with the resistor 31c and the output S20 of the filter 20. The FET 32 has a drain connected to a DC power supply 101 feeding a voltage of, e.g., 3 V. The capacitor 33 is connected between the drain of the FET 32 and the ground. The FET 32 is an MESFET (Metal Semiconductor FET) whose gate is 0.5 μm long and 750 μm wide. The capacitor 33 has a capacitance of 5 pF by way of example.

The premodulating circuit 30B is made up of a carrier input section 34 to which the carrier wave Sc is input, an FET (first transistor) 35, a self-biasing circuit 36, an inductor or load 37, and a decoupling circuit 38. The carrier input section 34 has a capacitor 34a for intercepting or blocking DC current and a resistor 34b. The capacitor 34a has one electrode connected to the carrier input terminal IN2 and the other electrode to the ground via the resistor 34b. In the embodiment, the capacitor 34a has a capacitance of, e.g., 3 pF, and the resistor 34b has a resistance of 200?. An FET 35, also implemented as an MESFET, has a gate (first control electrode) connected to the junction between the capacitor 34a and the resistor 34b. The gate of the FET 35 is 0.5 μm long and 300 μm wide.

The self-biasing circuit 36 has a resistor 36a and a capacitor 36b connected in parallel between the source of the FET 35 and the ground. The resistor 36a has a resistance of 4ƒO while the capacitor 36b has a capacitance of 3 pF, with the embodiment. The FET 35 has a drain (first conduction electrode) connected to one terminal of the inductor 37 whose inductance is 1.7 nH. The decoupling circuit 38 has an inductor 38a connected between the other terminal of the inductor 37 and the source of the FET 32 included in the driver 30A, and a capacitor 38b connected between the junction of the inductors 37 and 38a and the ground. The inductor 38a has an inductance of 3 nH while the capacitor 38b has a capacitance of 3 pF.

The main modulating circuit 30C is made up of an input section 39, an FET (second transistor) 40, a resistor 41 constituting a biasing circuit, a capacitor 42 constituting a decoupling circuit, and an inductor or load 43. The input section 39 has a capacitor 39a, an inductor 39b, and a resistor 39c. The capacitor 39a has one electrode connected to the drain of the FET 35 included in the premodulating circuit 30B. The inductor 39b and resistor 39c are serially connected between the capacitor 39a and the ground. The capacitor 39a has a capacitance of 1 pF while the inductor 39b has an inductance of 3.4 nH. Further, the resistor 39c has a resistance of 200 Ω. The FET 40 has a gate (second control electrode) connected to the junction between the inductor 39b and the capacitor 39a. The FET 40, also implemented as an MESFET, has 0.5 µm long, 600 µm wide gate. The resistor 41 is connected between the source of the FET 40 and the ground and has a resistance of 0.5 Ω.

The FET 40 has a drain (second conduction electrode) connected to one terminal of the inductor 43. The inductor 43 as the other terminal connected to the ground via the capacitor 42 and also to the source of the FET 32 included in the driver 30A. The inductor 43 has an inductance of 2.9 nH while the capacitor 42 has a capacitance of 5 kpF.

The low-pass filter 50 includes a capacitor 51 connected between the drain of the FET 40 included in the modulating circuit 30C and the ground. An inductor 52 is connected to the drain of the FET 40. A capacitor 53 is connected between the other end of the inductor 52 and the ground. To the other end of the inductor 52 also, one end of an inductor 54 is connected. A capacitor 55 is connected between the other end of the inductor 54 and an output terminal OUT. The capacitors 51, 53 and 55 have capacitances of 0.01 pF, 0.51 pF and 3 pF, respectively. The inductors 52 and 54 have inductances of 2.9 nH and 1.66 nH, respectively.

In operation, the baseband data Sb are input at a modulation rate of about 2 Mbaud to the LC low-pass filter 20 on the input terminal IN1. The 2 Mbaud baseband data Sb, in many cases, have a pulse waveform. The baseband data Sb with a pulse waveform has a spectrum including many frequency components of several megahertz. The LC low-pass filter 20 blocks the high frequency components with the serial inductors and discharges them to the ground via the parallel capacitors. That is, the low-pass filter 20 cuts off high frequency components included in the baseband data Sb to thereby limit the frequency band of the data Sb. The low-pass filter 20 then delivers baseband data S20 consisting only of frequency components below the cut-off frequency to the drain-controlled power modulator 30.

In the drain-controlled power modulator 30, the input section 31 of the driver 30A has high resistance with respect to the baseband data S20 limited in frequency band. The baseband data S20 are therefore applied to the gate of the FET 32 via the input section 31 without being attenuated. Because the drain of the FET 32 is directly connected to the DC power supply 101, the source voltage of the FET 32 varies in accordance with the voltage of the baseband signal S20. That is, the FET 32 plays the role of a source follower and outputs a drive signal whose voltage varies in accordance with the voltage of the baseband signal S20. This drive signal has a frequency sufficiently lower than that of the carrier wave Sc and is therefore fed to the drain of the FET 35 via the decoupling circuit 38 and inductor or load 37 without any attenuation. Consequently, the drain of the FET 35 is driven by the voltage of the drive signal.

The above drive signal output from the FET 32 is delivered also to the drain of the FET 40 via the capacitor or decoupling circuit 42 and inductor or load 43 without any attenuation. The drain of the FET 40 is therefore driven by the voltage of the drive signal.

On the other hand, the 5.8 GHz carrier wave Sc is input to the gate of the FET 35 via the input terminal IN2 and the carrier input section 34 of the premodulating circuit 30B. The carrier wave Sc input to the FET 35 has power of, e.g., 5 dBm. The drive signal fed from the FET 32 to the drain of the FET 35 sets the operation of the FET 35 in the linear amplifying and saturated ranges. The FET 35 amplifies the power of the carrier wave Sc to thereby produce a premodulated signal and outputs the premodulated signal via the drain. Specifically, when the drive signal exceeds a certain voltage, e.g., 0.5 V, the FET 35 operates in the linear amplification range, obtains a gain of 6 dB, and produces an 11 dBm output on the drain. In addition, the amplitude of the drain voltage corresponding to the carrier wave Sc is not dependent on the variation of the voltage of the drive signal.

When the above drive signal is lower than 0.5 V, the FET 35 operates in the saturation range. In this case, the amplitude of the drain voltage of the FET 35 corresponding to the carrier wave Sc varies in accordance with the level of the voltage of the drive signal corresponding to the baseband data S20. Specifically, when the level of the baseband data S20 is low, the amplitude of the 5.8 GHz drain voltage is also low. Particularly, when the level of the baseband data S20 is around zero, the 5.8 GHz drain voltage noticeably decreases. Because the 5.8 GHz signal is output via the drain of the FET 35, it is preliminarily modulated when the voltage of the baseband data S20 is low. This is successful to increase the degree of modulation to be effected by the modulator 30.

The 5.8 GHz premodulated signal appearing on the drain of the above FET 35 is input to the gate of the FET 40 of the modulating circuit 30C via the input section 39. The 5.8 GHz premodulated signal applied to the gate has sufficient power, e.g., 11 dBm. In response, the FET 40 operates up to its saturation range without regard to the voltage of the drive signal input to the drain and thereby produces a 5.8 GHz signal on its drain. Specifically, the amplitude of the 5.8 GHz signal appearing on the drain of the FET 40 increases with an increase in the voltage of the baseband data S20 and decreases with a decrease in the voltage of the same. In this manner, the 5.8 GHz signal on the drain of the FET 40 is linearly modulated by the voltage of the baseband data S20.

Further, the FET 40 operates up to the saturation range, i.e., over a sufficiently broad range with respect to current and voltage, so that the 5.8 GHz signal appearing on the drain of the FET 40 has great power. This signal appearing on the drain of the FET 40 constitutes modulated data S30. For example, when the baseband data S20 has its high level, the modulated data S30 is 16 dBm.

The modulated data S30 output from the drain of the FET 40 are input to the low-pass filter 50. The low-pass filter 50 passes the low frequency portion of the modulated data S30 therethrough. Specifically, the filter 50 has a cut-off frequency (e.g. 5.9 GHz) slightly higher than 5.8 GHz that is the fundamental frequency of the carrier wave Sc. The filter 50 therefore passes the fundamental wave of the modulated data S30 while filtering out higher order or harmonic components derived from the nonlinear operation effected in the saturation range. This successfully obviates spurious oscillation. Consequently, the filter 50 outputs 5.8 GHz transmission data S50 whose amplitude has been modulated by the baseband data Sb.

As stated above, the illustrative embodiment includes the LC low-pass filter 20 and drain-controlled power modulator 30 including the premodulating circuit 30B and modulating circuit 30C. Such a transmission front-end processor can directly generate the modulated data S30 having great power by modulating the 5.8 GHz carrier wave Sc with the voltage of the baseband data Sb. Furthermore, the modulating circuit 30C causes its FET 40 to operate up to the saturation range and then effects linear amplitude modulation. The front-end processor can therefore neglect higher order components ascribable to the variation of the bias point and that of device parameters, enhancing the yield of production of the circuits to a noticeable degree.

Moreover, the above front-end processor is constructed such that modulation completes when the FET 40 included in the modulating circuit 30C reaches the saturation range. It follows that the expected operation is guaranteed even when the bias current of the FET 40 is low, i.e., the operation based on the class-AB or even the class-B suffices. Therefore, highly efficient modulation is achievable with a minimum of power consumption. This is particularly desirable when it comes to the high power modulating circuit 30C. In addition, the low-pass filter 50 constituted by simple LC devices and having a cut-off frequency of about 5.9 GHz filters out higher order components output from the modulator 30. Such a low-pass filter 50 can be implemented as an IC and does not need an accurately set cut-off frequency, contributing a great deal to an increase in yield and a decrease in cost.

Consequently, the front-end processor with the LC low-pass filter 20, drain-controlled power modulator 30 and low-pass filter 50 causes a minimum of power to leak to adjoining channels and outputs great power. These are the prerequisites with an ETC system.

Figure 4:
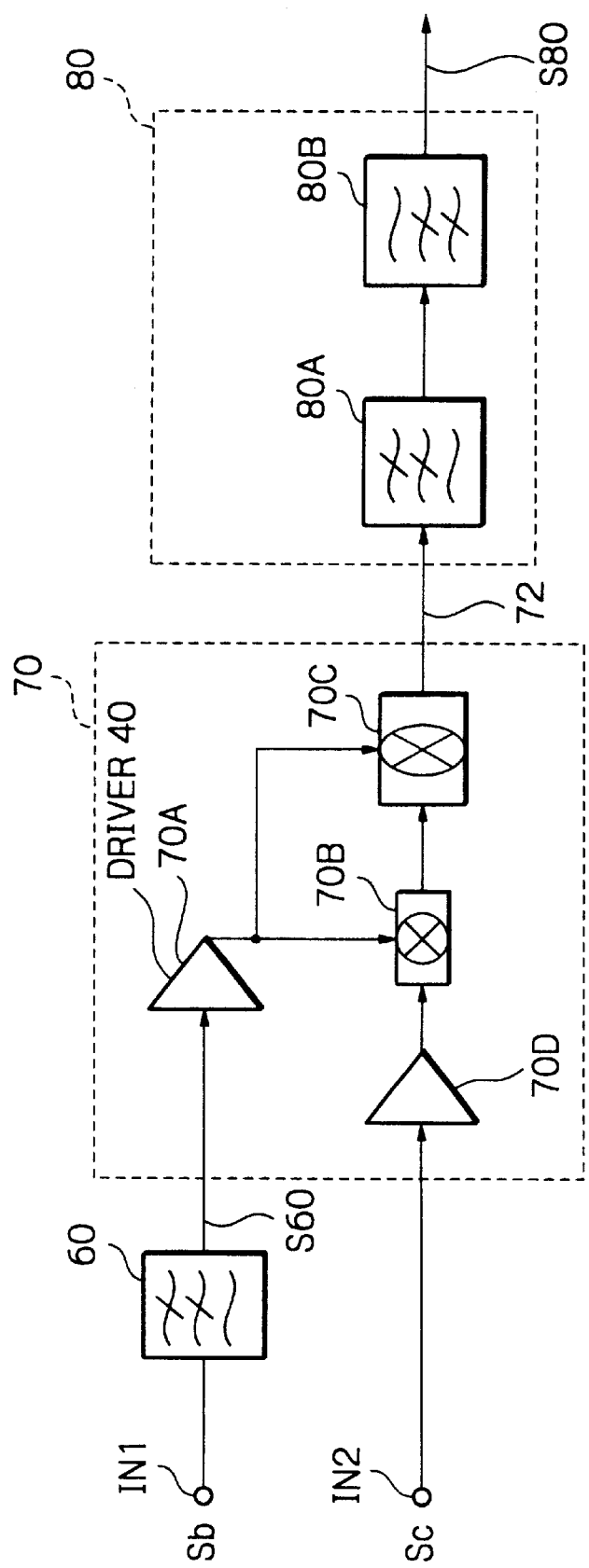
FIG. 4 is a schematic block diagram showing another alternative embodiment of the present invention.

Reference will be made to FIG. 4 for describing another alternative embodiment of the transmission front-end processor in accordance with the present invention. As shown, the front-end processor includes input terminals IN1 and IN2 to which baseband data Sb and a carrier wave Sc, respectively, are input. An LC low-pass filter 60 is connected to the input terminal IN1. A drain-controlled power modulator 70 with an amplifier is connected to the output of the LC low-pass filter 60 and input terminal IN2. The power modulator 70 has its output 72 connected to an input to a filter 80.

The LC low-pass filter 60 corresponds to the low-pass filter 11 of the embodiment shown and described with reference to FIG. 1. As with the embodiment described with reference to FIG. 2, the low pass filter 60 has a ladder circuit including a plurality of on-chip inductors connected in serial between its input terminal IN1 and its output terminal S60 and an on-chip capacitor connected in parallel with the ground, although not shown specifically.

The drain-controlled power modulator 70 includes a driver 70A, a premodulating circuit 70B and a main modulating circuit 70C, respectively corresponding to the driver 30A, premodulating circuit 30B and modulating circuit 30C of the previous embodiment. In this embodiment, the power modulator 70 additionally includes a preamplifier 70D. The driver 70A is connected to the output of the LC low-pass filter 60 while the preamplifier 70D is connected to the input terminal IN2. The premodulating circuit 70B is connected to the output of the preamplifier 70D and the output of the driver 70A. The filter 80 is made up of a low-pass filter 80A and a high-pass filter 80B.

Figure 5:
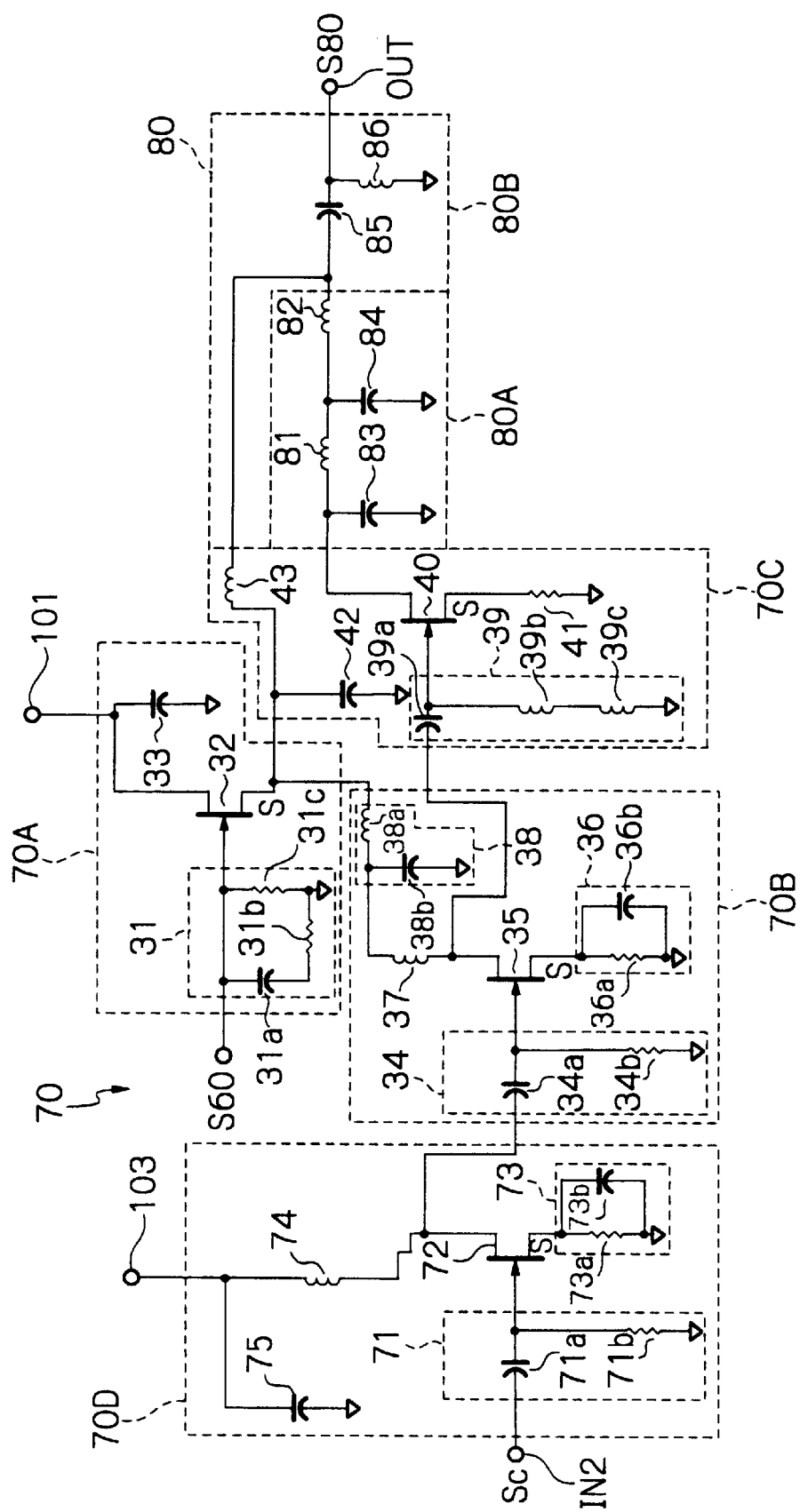
FIG. 5 is a circuit diagram showing a specific configuration of a drain-controlled power modulator and a filter included in the embodiment of FIG. 4.

FIG. 5 shows a specific configuration of the drain-controlled power modulator 70 and filter 80. In FIG. 5, structural elements like the structural elements shown in FIG. 3 are designated by identical reference numerals. As shown, the driver 70A and premodulating circuit 70B may be respectively identical in circuit arrangement with the driver 30A and premodulating circuit 30B, FIG. 3, and will not be described specifically in order to avoid redundancy.

The preamplifier 70D has an input section 71, an FET 72, a self-biasing circuit 73, an inductor or load 74, and a capacitor or decoupling circuit 75. The input section 71 has a capacitor 71a connected to the input terminal IN2 at one electrode thereof, and a resistor 71b connected between the other electrode of the capacitor 71a and the ground. The FET 72 has a gate connected to the junction between the capacitor 71a and the resistor 71b. The self-biasing circuit 72 has a resistor 73a and a capacitor 73b connected between the source of the FET 72 and the ground. The FET 72 has its drain connected to a single 3 V power supply 103 via the inductor 74 and connected to the input section 34 of the premodulating circuit 70B.

The capacitor 71a has a capacitance of, e.g., 3 pF while the resistor 71b has a resistance of, e.g., 70 f?. The gate of the FET 72, which is a MESFET, is 0.5 f$\mu$m long and 150 f$\mu$m wide. The resistor 73a has a resistance of 8 f? while the capacitor 73b has a capacitance of 3 pF. Further, the inductor 74 has an inductance of 1.7 nH while the capacitor 75 has a capacitance of 3 pF.

The modulating circuit 70C, like the modulating circuit 30C shown in FIG. 3, has the input section 39, FET 40, resistor or biasing circuit 41, and capacitor or decoupling circuit 42. In the illustrative embodiment, the inductor 43 forms part of the load. Specifically, the inductor 43 has its one end connected to the capacitor 42 and the source of the FET 32 of the driver 70A, and its the other end to the drain of the FET 40 via the filter 80.

The low-pass filter 80A included in the filter 80 is made up of inductors 81 and 82 and capacitors 83 and 84. The inductors 81 and 82 are serially connected between the drain of the FET 40 and the other end of the inductor 43. The capacitor 83 is connected between the junction of the inductor 81 and the drain of the FET 40 and the ground. The capacitor 84 is connected between the junction of the inductors 81 and 82 and the ground. The inductors 81 and 82 constitute the load of the FET 40 in combination with the inductor 43. The inductor 43 has an inductance of, e.g., 1.7 nH while the inductors 81 and 82 have inductances of 2.9 nH and 1.66 nH, respectively. The capacitors 83 and 84 have capacitances of 0.01 pF and 0.51 pF, respectively. With those constituents, it is possible to match the drain-controlled power amplifier 70 and filter 80 with respect to impedance.

The high-pass filter 80B also included in the filter 80 is implemented as a f? type LC circuit. Specifically, a capacitor 85 is connected to the inductor 43 of the modulating circuit 70 and the output of the low-pass filter 80 at one end thereof. An inductor 86 is connected between the other electrode of the capacitor 85 and the ground. The capacitor 85 has a capacitance of 51 pF while the inductor 86 has an inductance of 1.66 nH. The junction between the inductor 86 and the capacitor 85 is connected to an output terminal OUT.

The operation of the above transmission front-end processor will be described hereinafter. The LC low-pass filter 60 blocks high frequency components with the serial inductors and discharges them to the ground with the parallel capacitors. That is, the low-pass filter 60 cuts off high frequency components included in the baseband data Sb to thereby limit the frequency band of the data Sb. The low-pass filter 20 then delivers baseband data S60 consisting only of frequency components below the cut-off frequency to the driver 70A of the drain-controlled power modulator 30, as in the previous embodiment.

On the other hand, assume that the carrier wave Sc applied to the input terminal IN2 has power of, e.g., 0 dBm. Then, the FET 72 included in the preamplifier 70D performs the class-A operation, i.e., connects it source to the ground and biases itself so as to linearly amplify the above weak carrier wave Sc. As a result, the 0 dBm carrier wave Sc becomes a 5 dB signal and is input to the input section 34 of the premodulating circuit 70B. The driver 70A and premodulating circuit 70B operate in the same manner as in the previous embodiment.

A drive signal output from the driver 70A and corresponding to the baseband data Sb is delivered to the drain of the FET 40 of the modulating circuit 70C via the decoupling circuit and inductors 43, 82 and 81. Also, a 5.8 GHz premodulated signal output from the premodulating circuit 70B is input to the gate of the FET 40 via the input section 39. The FET 40 feeds 5.8 GHz modulated data S70 to the low-pass filter 80A via its drain in the same manner as in the previous embodiment. The low-pass filter 80A passes the low frequency portion of the modulated data S70 while filtering out higher order components higher than 5.8 GHz, which is the fundamental frequency of the carrier wave Sc.

The high-pass filter 80B has a cut-off frequency lower than 5.8 GHz and passes the fundamental wave of the 5.8 GHz signal output from the low-pass filter 80A. Specifically, the high-pass filter 80B greatly attenuates 2 GHz to 4 GHz components that are apt to oscillate in the FET 40. The resulting signal output from the high-pass filter 80B is sent out as transmission data S80.

A transmission front-end processor having the specific configuration shown in FIG. 5 was made on an experimental basis and estimated as to some different factors. Specifically, the FETs 32, 35, 40 and 72 were formed on a gallium arsenide (GaAs) substrate. These FETs were combined with spiral inductors, laminate capacitors, GaAs-implanted resistors and double gold (Au) wiring in the form of a chip sized 3 mm ×1.2 mm. The chip was mounted on an exclusive package.

Figure 6A:
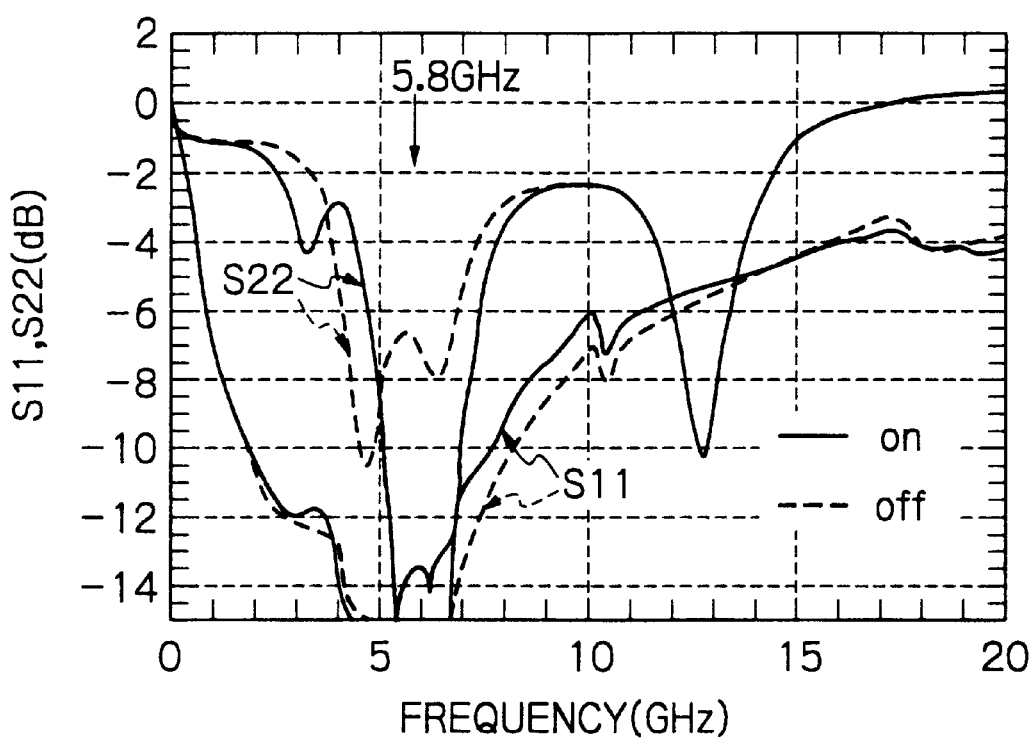
FIGS. 6A and 6B are graphs plotting data obtained with an experimental transmission front-end processor having the specific configuration of FIG. 5 with respect to an S parameter.
Figure 6B:
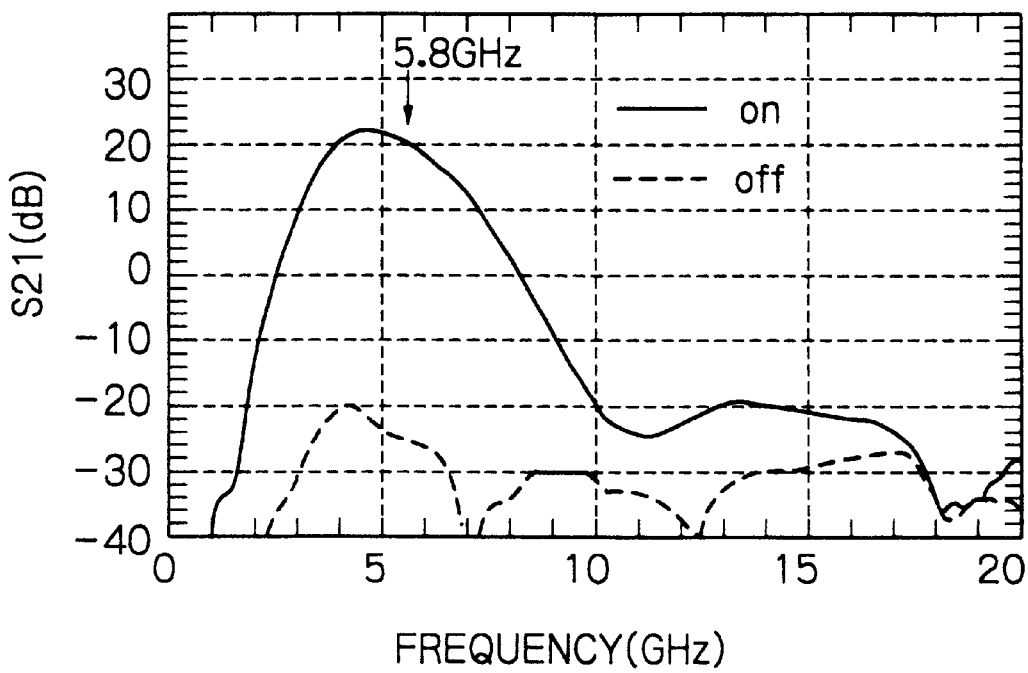

FIGS. 6A and 6B show data obtained with the above experimental transmission front-end processor with respect to an S parameter. As FIG. 6A indicates, when the baseband data an Sb were in the ON state thereof, i.e., 3 V (solid curves) or when the data were in the OFF state thereof, i.e., 0 V (dashed curves), the front-end processor showed a remarkably small input/output return loss. Also, as FIG. 6B plots, a gain S21 varied by more than about 40 dB between the ON state and the OFF state of the baseband data Sb. This proves that the front-end processor successfully operated as an ASK modulator with a higher ON/OFF ratio.

Figure 7:
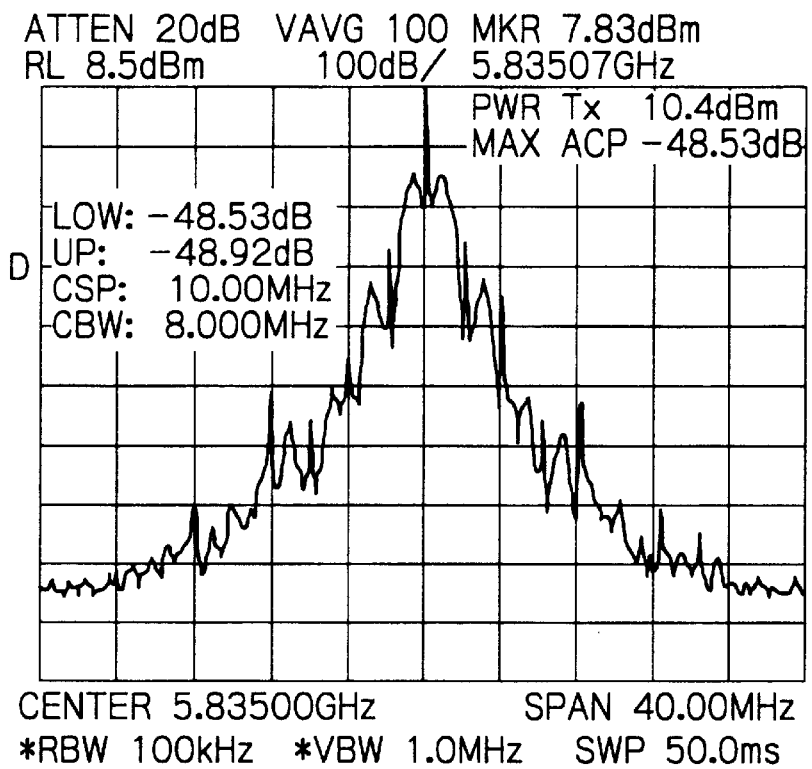
FIG. 7 is a graph plotting leakage power to adjoining channels actually measured with the experimental product.

FIG. 7 shows the spectrum of the transmission data S80 and power leakage to adjoining channels actually measured with the above experimental product. As shown, band limited, pseudo-random baseband data with a modulation rate of 2.048 Mbaud and a 5.835 GHz carrier wave Sc with power of 0 dBm were input to the front-end processor. As FIG. 7 indicates, the modulation broadened a single 5.835 GHz spectrum. However, the maximum leakage of power to an adjoining 8 MHz channel having a center frequency spaced by 10 MHz was −48.53 dBc, which is far smaller than −40 dBc required for an ETC system. This shows that the 5.8 GHz carrier wave Sc was linearly modulated by the baseband data Sb.

Figure 8:
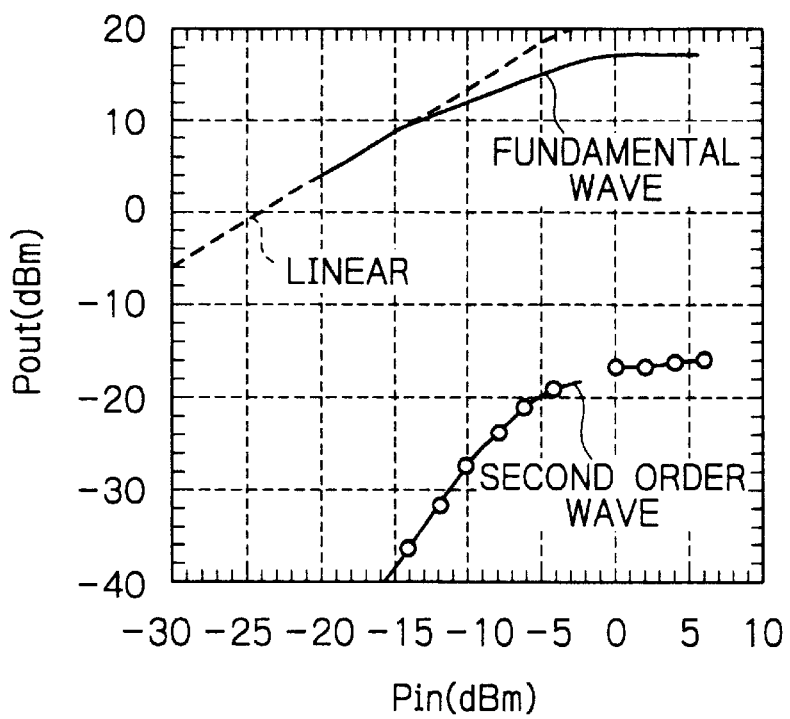
FIG. 8 is a graph plotting a relation between the input power and the output power also determined with the experimental product.

FIG. 8 shows a relation between the input power Pin and the output power Pout of the experimental product measured when the baseband data Sb were in the high level of 3 V. As shown, the 5.8 GHz fundamental wave became noticeably nonlinear when the power exceeded −15 dBm, proving that the modulator was normally operating in its saturation range. Also, when the carrier wave Sc was input with power of 0 dBm, the output power Pout was as great as 16 dBm. Further, the second or higher order wave, was as low as about −17 dB and indicated that the low-pass filter 80A and high-pass filter 80B successfully obviated spurious oscillation in combination.

As stated above, the illustrative embodiment includes the LC low-pass filter 60, drain-controlled power modulator 70 including the preamplifier 70D, driver 70A, premodulating circuit 70B and modulating circuit 70C, and filter 80. Such a front-end processor can also reduce power leakage to adjoining channels, increase output power and yield, and reduce spurious oscillation when applied to, e.g., an ETC system.

Further, even when the power of the carrier wave Sc is small, the front-end processor not only increases the gain, but also insures desirable modulation with the preamplifier 70D. In addition, the filter 80 made up of the low-pass filter 80A and high-pass filter 80B guarantees transmission data S80 lying in the 5.8 GHz band and obviates the radiation of higher order waves and the low frequency oscillation of the circuitry.

In the specific circuitry shown in FIGS. 3 and 5, the power modulators 30 and 70 include the FETs 32 and 35 and FET 40, respectively. Alternatively, the power modulators 30 and 70 each may be implemented by a bipolar transistor whose collector is controlled. While the filters 50 and 80 each are constituted by a low-pass filter or the combination of a low-pass filter and a high pass filter, each of them may be constituted by a 8 GHz band-pass filter. With the band-pass filter, it is also possible to output high quality transmission data S30 or S80. If desired, the preamplifier 70D, premodulating circuits 30B and 70B and modulating circuits 30C and 70C self-biasing in the illustrative embodiments may be suitably biased by a power supply connected thereto.

In summary, it will be seen that the present invention provides a transmission front-end processor capable of outputting great transmission power with a minimum of power leakage because it does not use the conventional linear amplifier. In addition, the transmission front-end processor has a miniature configuration and can be produced with high yield.

The entire disclosure of Japanese patent application No. 128561/1999 filed on May 10, 1999 including the specification, claims, accompanying drawings and abstract of the disclosure is incorporated herein by reference in its entirety.

While the invention has been described with reference to the illustrative embodiments, it is not to be restricted by those embodiments. It is to be appreciated that those skilled in the art can change or modify the embodiments without departing from the scope and sprit of the present invention.

What is claimed is:

1. A transmission front-end processor for modulating an amplitude of a carrier wave with baseband data, and setting power of a resultant, modulated carrier wave at a required value while controlling a leakage of power to adjoining channels to thereby output transmission data, comprising:

a first filter connected to an input terminal to which the baseband data are applied, and removing frequency components which would otherwise cause the power of the baseband data to leak to the adjoining channels;

a power modulator to which the carrier wave and the baseband data passed through said first filter are applied, and controlling an amplitude of the carrier wave with the baseband data, setting power of a result of control at the required value, and outputting the power; and a second filter removing higher order components from the carrier wave included in an output signal of said power modulator to thereby output the transmission data;

said modulator modulating the amplitude of the carrier wave up to a non-linear amplifying, saturated range with a fundamental wave of the carrier wave made linear with respect to a voltage of the baseband data.

2. A processor in accordance with claim 1, wherein said power modulator comprises:

a premodulating circuit including a first transistor comprising a first conduction electrode driven in accordance with a level of the baseband data passed through said first filter, and a first control electrode to which the carrier wave is applied, whereby a power-premodulated signal produced by amplifying an amplitude of the carrier wave with the level of the baseband data is output on said first conduction electrode; and a modulating circuit including a second transistor comprising a second conduction electrode driven in accordance with the level of the baseband data passed through said first filter, and a second control electrode to which the premodulated signal is applied from said first conduction electrode, whereby a power-modulated signal produced by amplifying an amplitude of the power-premodulated signal with the level of the baseband data is output on said second conduction electrode.

3. A processor in accordance with claim 2, wherein said second filter comprises a low-pass filter for removing the higher order components of the carrier wave.

4. A processor in accordance with claim 2, further comprising a high-pass filter for removing low frequency components included in the output signal of said power modulator and causative of low frequency oscillation.

5. A processor in accordance with claim 2, further comprising a preamplifier for amplifying the power of the carrier wave and then feeding the amplified power to said power modulator.

6. A processor in accordance with claim 1, wherein said second filter comprises a low-pass filter for removing the higher order components of the carrier wave.

7. A processor in accordance with claim 6, further comprising a high-pass filter for removing low frequency components included in the output signal of said power modulator and causative of low frequency oscillation.

8. A processor in accordance with claim 3, further comprising a preamplifier for amplifying the power of the carrier wave and then feeding the amplified power to said power modulator.

9. A processor in accordance with claim 1, further comprising a high-pass filter for removing low frequency components included in the output signal of said power modulator and causative of low frequency oscillation.

10. A processor in accordance with claim 9, further comprising a preamplifier for amplifying the power of the carrier wave and then feeding the amplified power to said power modulator.

11. A processor in accordance with claim 1, further comprising a preamplifier for amplifying the power of the carrier wave and then feeding the amplified power to said power modulator.

* * * * *